United States Patent [19]
Colton

[11] 4,430,895
[45] Feb. 14, 1984

[54] PIEZORESISTIVE ACCELEROMETER

[75] Inventor: Russell F. Colton, Cedar Rapids, Iowa

[73] Assignee: Rockwell International Corporation, El Segundo, Calif.

[21] Appl. No.: 345,251

[22] Filed: Feb. 2, 1982

[51] Int. Cl.³ ............................................. G01P 15/12
[52] U.S. Cl. .................... 73/497; 73/517 R; 338/43
[58] Field of Search ................. 73/497, 516 R, 517 R; 338/3, 5, 43, 46

[56] References Cited

U.S. PATENT DOCUMENTS

| 3,023,627 | 3/1960 | Geyling | 73/517 R |
| 4,050,049 | 9/1977 | Youmans | 73/517 R |
| 4,306,456 | 12/1981 | Maerfeld | 73/517 R |
| 4,333,349 | 6/1982 | Mallon et al. | 338/3 |

OTHER PUBLICATIONS

"IC Accelerometer", *Electronic Design* 4 (Feb. 15, 1978), pp. 36–37.

*Primary Examiner*—Gerald Goldberg
*Assistant Examiner*—John E. Chapman, Jr.
*Attorney, Agent, or Firm*—George A. Montanye; H. Fredrick Hamann

[57] ABSTRACT

A piezoresistive acceleration sensing transducer is disclosed which enables low cost microcircuit construction of accelerometers. A silicon wafer is etched to form individual acceleration sensing elements each of which includes a mass ring suspended from a diaphragm and mounted to a center pedestal support portion. A plurality of piezoresistive strain gauges are located on the diaphragm about the periphery of the pedestal portion and are positioned to form a circuit for sensing strain produced in the diaphragm by movement of the mass ring in response to acceleration. A pair of temperature sensors are located in a zero-stress area of the diaphragm to compensate for temperature effects. In one embodiment, the gauges are coupled in a bridge circuit to provide a measure of acceleration in one axis only. In another embodiment, the mass ring is modified to locate its center of mass above the plane of the diaphragm so that the mass ring responds to acceleration in three axes. Selected outputs from the strain gauges are then used to provide a measurement of acceleration in each of the three axes.

18 Claims, 8 Drawing Figures

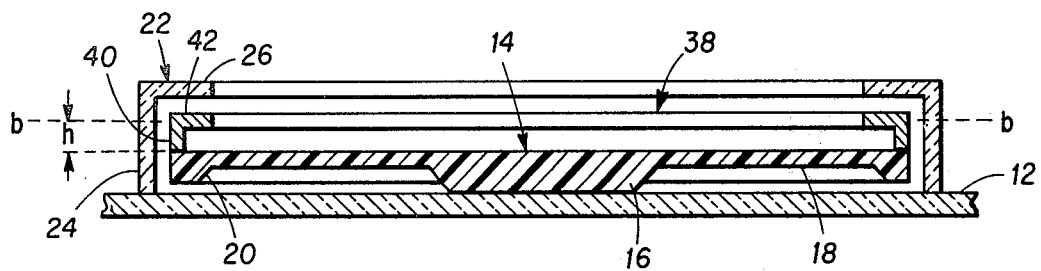
FIG 4
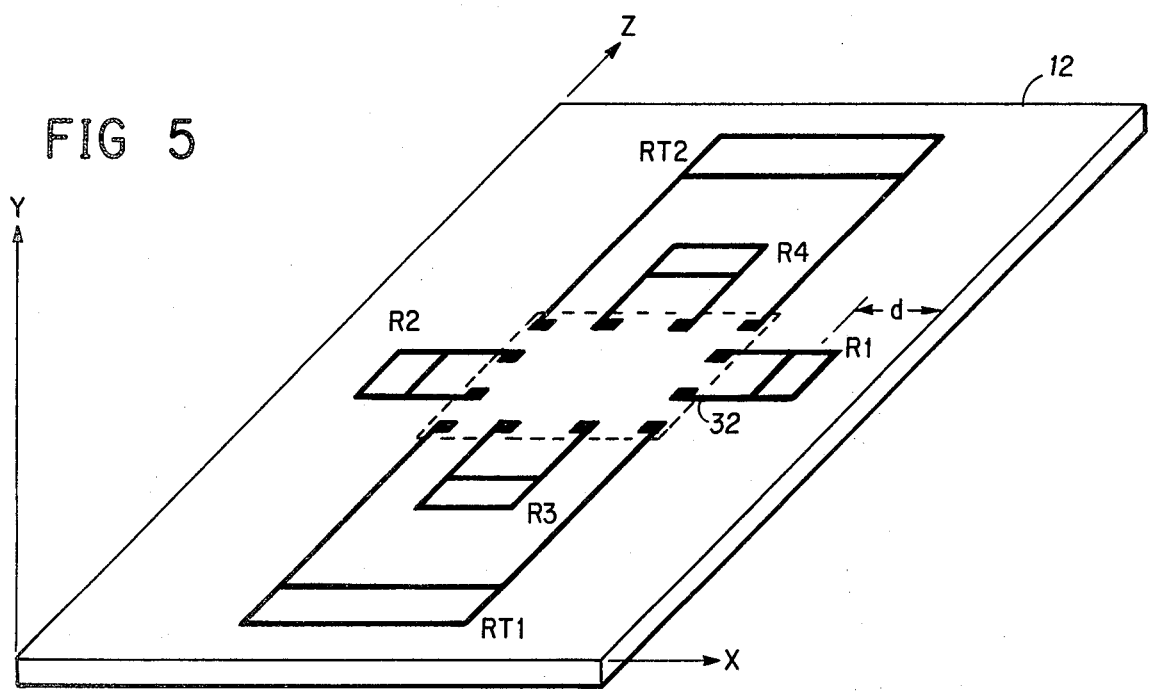
FIG 5
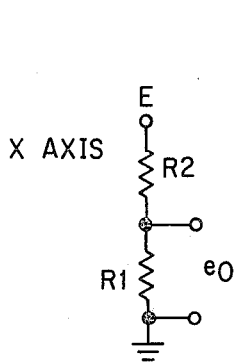
FIG 6a
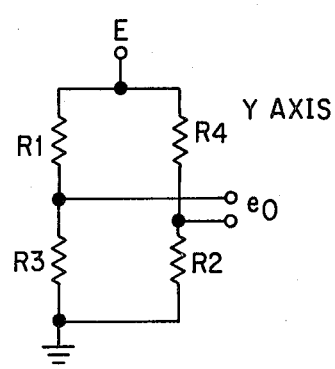
FIG 6b
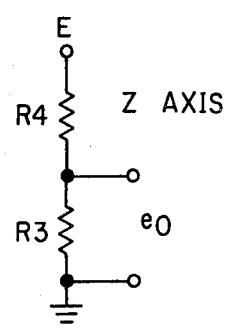
FIG 6c
FIG 6

PIEZORESISTIVE ACCELEROMETER

BACKGROUND OF THE INVENTION

The present invention relates to acceleration transducers and more particularly to piezoresistive acceleration transducers which can be easily fabricated using microcircuit techniques.

Piezoresistive transducers are well known in the prior art and generally utilize a plurality of piezoresistive strain gauge elements integrally formed on a flexible diaphragm of semiconductive material rigidly retained about its periphery. The diaphragm typically comprises a crystalline silicon of one conductivity type with the strain gauge piezoresistive elements formed of opposite conducitivity type by diffusion or other appropriate process. The strain gauge piezoresistors are located in predetermined stress positions about the surface of the flexible diaphragm and detect forces produced mechanically by fluid pressure or other forces applied to the face of the diaphragm. The forces are detected when bending of the diaphragm causes stress which changes the resistance of the piezoresistors in the area of the strain gauges. Thus, as the diaphragm bends in response to pressure, acceleration or other mechanical force, the magnitude of that force can be measured by detecting the changes in the electrical characteristics of the piezoresistors.

A variety of devices have been constructed which employ the piezoresistive effect. It has been found that different constructions and configurations improve the accuracy and sensitivity of the transducers. In some instances, for example, the crystal axis of the silicon or other semiconductive diaphragm material is oriented in predetermined directions and the piezoresistors forming the strain gauges are aligned with respect to that orientation. In other instances the number and interconnection of the gauges is varied to obtain increased sensitivity and compensation for inaccuracies that result during strain detection.

Temperature effects have been of particular interest since changes in temperature affect the electrical characteristics of the gauges and reduce sensor accuracy. One proposed method of overcoming temperature effects and other inaccuracies has been to use multiple gauges in a bridge circuit. The bridge circuit is constructed so that the temperature effects cancel one another thereby resulting in a more accurate reading. While such techniques have been successful to some extent, the devices have been somewhat limited in their application and acceptability in certain environments. In addition, the success of such techniques requires each of the bridge resistors to be formed of the same material and subjected to similar thermal environments which do not vary due to the location of the gauges on the diaphragm.

In an attempt to overcome temperature problems, another technique proposed the use of heating elements to maintain the environment of the transducer at a predetermined temperature. Normally a heating resistor is controlled to provide a specific temperature in response to a sensing element which detects the temperature of the area surrounding the transducer. As the temperature changes, the output of the heating element is either increased or decreased to compensate for the required temperature variation. This technique, however, requires substantial power output and substantial power dissipation where wide ranges of temperature are encountered. In addition, the more complex structure required to provide temperature compensation over wide ranges reduces the versatility of such transducers.

In aircraft applications particularly, sensors have been subject to high mechanical stresses due to vibration and other operational conditions as well as to wide temperature variations with changes in altitude. While solid-state devices, including the above-mentioned piezoresistive configurations, are better able to withstand those stresses and temperature effects than prior mechanical devices, there is still a need to improve the construction and configuration of the transducer to improve accuracy and to limit breakage and damage. In particular, there is a need to prevent sensor damage during rough handling or high mechanical stresses such as are encountered during severe weather conditions. There is also a need to protect the transducer from damage caused by resonance when the structure is subject to the natural resonant frequencies of aircraft engines and the like. By controlling the configuration to minimize damage in such environments, the accuracy as well as the repair and replacement costs can be significantly improved.

In accordance with the above, the present invention has been developed to overcome the above known and other deficiencies and, more particularly, to provide an improved acceleration transducer for use in avionics systems.

SUMMARY OF THE INVENTION

A piezoresistive acceleration transducer is formed using an acceleration-responsive element formed from a single semiconductive substrate. The substrate is etched to form the acceleration-responsive element which includes a pedestal supporting a bending diaphragm which in turn supports a mass ring responsive to acceleration. The element is mounted on a substrate and retained by a limiting ring to provide a small, compact structure which is highly resistant to shock damage. A plurality of piezoresistive elements are deposited on the diaphragm about the periphery of the pedestal support in the area where strain is induced by the bending of the diaphragm in response to movement of the mass ring. The piezoresistive elements act as strain gauges and in one embodiment are coupled in a configuration to provide a bridge output which is a measurement of acceleration along one axis. A pair of piezoresistive temperature elements are located in the zero-stress area of the diaphragm and are used to provide a measure of semiconductor temperature to provide compensation for temperature effects during transducer use.

In another embodiment of the invention, the mass ring is modified to have a center of mass, which is located above the plane of the diaphragm so that the mass ring responds to acceleration in multiple axes. The modification may be made by the attachment of a separate member which extends above the plane of the diaphragm and responds to acceleration in three orthogonal axes. In this embodiment, the measure of acceleration in any given axis is determined by sensing the output of specific piezoresistive elements located on the stress line of the diaphragm about the periphery of the pedestal support.

It is therefore a feature of the invention to provide an acceleration transducer which is of simple and low cost construction.

It is a further feature of the invention to provide a piezoresistive acceleration transducer which provides improved sensitivity for the measurement of acceleration with the use of a bridge circuit.

Yet another feature of the invention is to provide a piezoresistive acceleration transducer which includes temperature sensors in zero-stress areas to provide compensation for temperature during acceleration detection.

Another feature of the invention is to provide a piezoresistive acceleration transducer which includes a mass ring suspended from an elastic diaphragm about a central pedestal support to provide improved acceleration sensitivity and reduced transducer size.

Still another feature of the invention is to provide an acceleration transducer wherein the mass extending from the diaphragm and central pedestal support enables easy damping for shock and vibration limiting.

A further feature of the invention is to provide a piezoresistive acceleration transducer wherein the mass ring, diaphragm and pedestal support can be easily formed with microcircuit etching techniques.

Still a further feature of the invention is to provide a piezoresistive acceleration transducer which may be easily configured for sensing acceleration in each of three orthogonal axes.

These and other novel features of the invention will become apparent from the following detailed description when considered with the accompanying drawings wherein:

BRIEF DESCRIPTION OF THE DRAWINGS

FIG. 4 is a side-sectional view of another embodiment of the acceleration transducer.

FIG. 5 is a schematic diagram showing the orientation of the transducer and piezoresistive elements for sensing acceleration in each of three orthogonal axes.

FIG. 6 comprising FIGS. 6a, 6b and 6c is a schematic diagram showing the voltage outputs indicative of acceleration in each of three orthogonal axes.

DETAILED DESCRIPTION OF A PREFERRED EMBODIMENT

Figure 2:
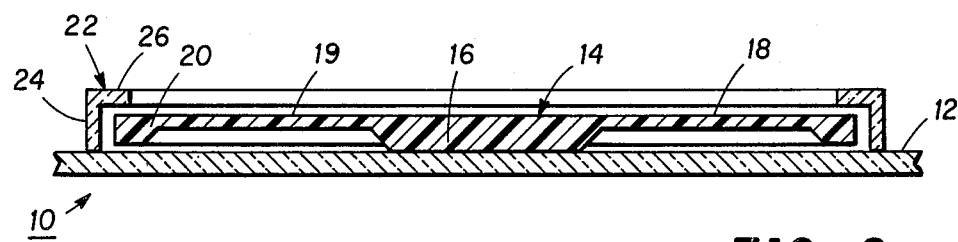
FIG. 2 is a side-sectional view taken along the line 2—2 in FIG. 1.

Details of the invention are shown in the drawings wherein like numerals are used to refer to like elements throughout. Referring first to FIG. 2, there is shown a side-sectional view of the acceleration transducer 10 which includes a mounting member or substrate 12 and an acceleration-responsive semiconductor element 14. The substrate 12 may be formed as a planar or plate-like member of glass or other similar electrically non-conductive material. The acceleration-responsive element 14 may be a semiconductor material such as monocrystalline silicon as will be more particularly described. The semiconductor element 14 includes a central post or pedestal support portion 16 having a generally rectangular configuration, an elastic diaphragm portion 18 and a mass ring portion 20. The diaphragm portion 18 extends peripherally from the support portion 16, parallel to substrate 12 and forms a generally rectangular ring about the support portion 16. A mass ring portion 20 peripherally extends from the diaphragm portion 18 and is configured to have the shape of an rectangular ring spaced from the substrate 12. By way of example, the pedestal may be in the form of a square having sides of 1.47 mm and a thickness of 0.254 mm. The diaphragm may be formed to have a width of 1.32 mm and a thickness of 0.0254 mm. The mass ring may be constructed to have a width of 0.457 mm and a thickness of 0.229 mm.

The acceleration-responsive semiconductor element 14 may be etched from a silicon wafer to form the support portion 16, diaphragm portion 18 and mass ring portion 20. Using appropriate masking techniques, each of the identified areas can be formed by conventional etching processes to have precise dimensions for accurate control of the semiconductor configuration. The diaphragm portion 18 may be etched to have a thickness which allows the portion 18 to be elastic and bend in response to forces applied to mass ring 20 in response to acceleration. The mass ring portion 20 responds to acceleration causing the diaphragm portion 18 to bend and induce strain in particular regions of the diaphragm as will be subsequently described.

Figure 3:
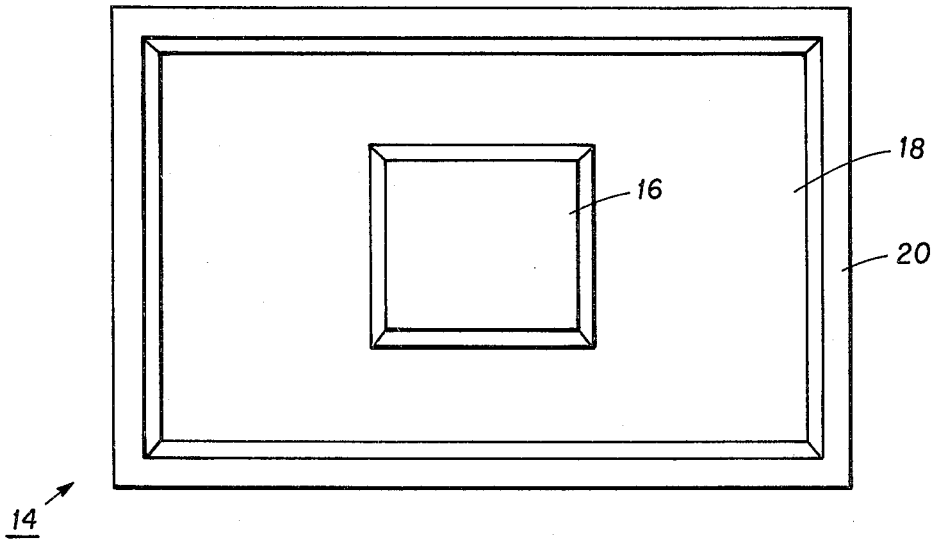
FIG. 3 is a bottom view of the acceleration-responsive element of the transducer.

The top surface of semiconductor element 14 is generally formed as a planar surface 19 while the bottom is formed as more particularly shown in FIG. 3 to create the center post portion 16, diaphragm portion 18, and mass ring portion 20. During construction, the mass ring portion 20 is configured so that the center of mass of that portion 20 is located in essentially the same plane as that of the diaphragm portion 18. As a result of this configuration, the mass ring will respond substantially to acceleration forces in an axis perpendicular to the planar surface of the diaphragm. If the mass of the ring portion 20 is insufficient for proper sensitivity, additional mass may be added by metallic plating of the mass ring portion 20 or any other method designed to increase the mass ring portion 20 while still conforming to the above teachings.

Damping ring 22 is generally formed as an L-shaped annular rectangular ring which is bonded to the substrate 12 and extends adjacent the periphery of the mass ring 20. The damping ring 22 includes a support member 24 which extends perpendicular to substrate 12 and a damping arm 26 which extends generally perpendicular to the support member 24 and parallel to the planar surface 19 of semiconductor element 14. The ring 22 is constructed to have a dimension and configuration to allow close tolerance spacing about the mass ring 20 and serves to limit the movement of the mass ring 20 (in an axis perpendicular to the surface of substrate 12) in response to acceleration, thereby preventing damage during shock and high resonant conditions. The damping ring 22 may be formed as an electrically non-conductive material or any other material capable of providing the mechanical limiting features previously described.

Figure 1:
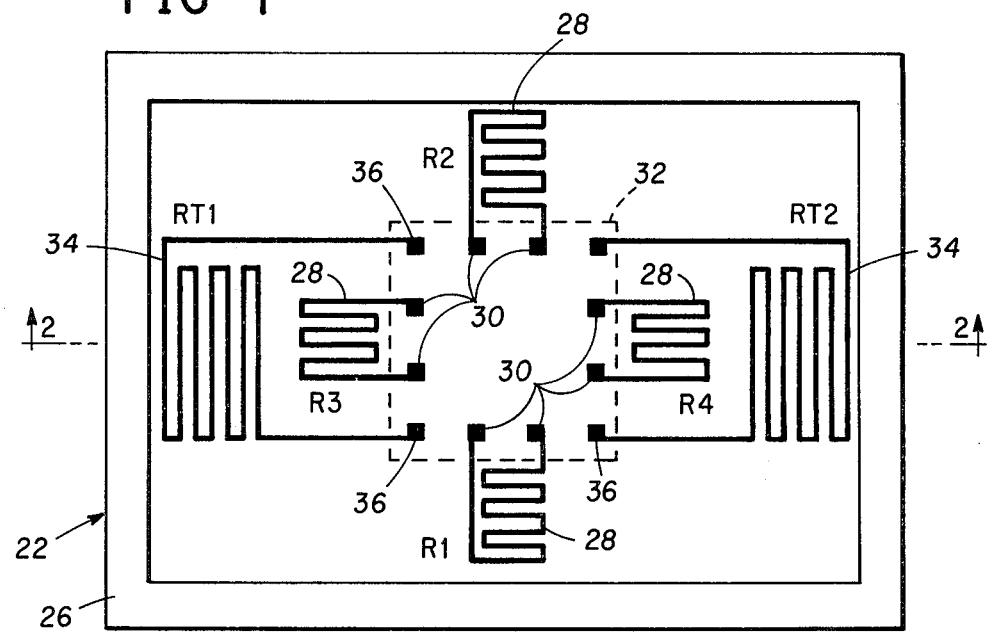
FIG. 1 is a top view of the acceleration transducer of the present invention.

Referring now to FIG. 1, there is shown a configuration of piezoresistive strain gauges which detect stresses induced in the diaphragm portion 18 due to its bending in response to acceleration. The use of piezoresistive strain gauges deposited on a semiconductor material to sense strain induced by diaphragm bending is well known in the art and will not be described in great detail herein. Generally, however, the semiconductor element 14 may be formed as a monocrystalline semiconductive material of the n-type cut from a single wafer of silicon to have a specific crystallographic orientation. The strain gauge piezoresistors R1, R2, R3, and R4 are p-type silicon formed on the planar surface 19 by diffusion or epitaxial growth as is well known in the art. Suitable masking and etching techniques are used to provide the appropriate configuration. The piezoresistors include a resistive portion 28 and terminal pads 30. The resistive portions 28 are formed on the planar surface 19 in a stress area adjacent the pedestal outlined by dashed line 32. The resistive portions 28 are formed as a plurality of serpentine or folded elongated strips which are arranged parallel to a preselected crystallographic axis of the semiconductor element 14. The terminal pads 30 are located within the boundary 32 of the pedestal 16 and provide the electrical contacts for coupling electronic sensing circuitry (not shown) capable of detecting the strain-induced resistance changes in the resistive portions 28 as a measure of acceleration.

In accordance with the present invention, the resistive portions 28 of piezoresistors R1, R2, R3, and R4 are deposited with one resistive portion located adjacent each side of the rectangular boundary 32 of pedestal 16 and are symmetrically spaced 90° apart about the center of the pedestal. Also deposited on the semiconductor element 14 are two temperature sensing piezoresistors RT1 and RT2. These piezoresistors are formed to have resistive portions 34 and terminal pads 36 which are deposited by diffusion or epitaxial growth in the same manner as described with reference to portions 28 and 30 above. The resistive portions 34 are deposited on the surface 19 of semiconductor element 14 in a zero-stress (no bending stresses) area adjacent piezoresistors R3 and R4 respectively. It is important that RT1 and RT2 be maintained in a zero-stress area in order that their response indicate solely temperature variations rather than strain-induced variations in those piezoresistive elements. Outputs from each of the terminals 30 and 36 may be provided by individual leads coupled to form a terminal bus of rectangular configuration (not shown) and designed to be placed over each of the contacts simultaneously for providing electrical couplings from each of the resistive areas 28 and 34 to electronic measuring or control circuitry.

In accordance with the present invention, the construction of the semiconductor element 14 as shown in FIG. 2 provides acceleration detection which is more sensitive than prior devices. Use of the outer mass ring 20 allows acceleration detection with the same sensitivity as prior known devices but with a size reduction approximating an order of magnitude. The large outer circumference of the mass ring portion 20 coupled with its lower surface parallel to substrate 12 provides improved squeeze film damping characteristics. Also, the movement of mass ring 20 may be controlled by varying the spacing between the arm 26 and the mass ring 20 to provide additional squeeze film damping to limit the total amount of travel of mass ring 20 for reducing its susceptibility to shock and vibration damage.

In order to provide an output representative of acceleration, the piezoresistors R1, R2, R3, and R4 are coupled to electronic circuitry (not shown) which may connect the resistances in a bridge circuit to provide an output representing acceleration as shown in FIG. 6b. Referring to FIG. 5, the orientation of the transducer 10 with respect to each of three orthogonal axes (x, y, and z) is shown. In accordance with this embodiment of the invention, the acceleration sensed by transducer 10 is acceleration in the y axis. As can be seen, a voltage E is applied across serially connected piezoresistors R1 and R3 to ground. The same voltage is applied across serially connected piezoresistors R4 and R2 to ground. A voltage output $e_o$, having one lead coupled to the junction of resistors R1 and R3 and the other lead coupled to the junction of resistors R4 and R2, provides a detection of acceleration. In this configuration, when the transducer is subjected to acceleration in the y axis, two of the strain gauge resistors increase in resistance (R3 and R4) and two of the strain gauge resistors decrease in resistance (R1 and R2). Acceleration in the y direction (AY) may then be represented as $AY \approx (\Delta R3)+(\Delta R4)-(\Delta R1)-(\Delta R2)$ which is proportional to the voltage $e_o$ provided at the output to the bridge circuit of FIG. 6b.

By connecting the piezoresistors as shown in FIG. 6b, the circuit is capable of providing four times the sensitivity as would be available with a single strain gauge resistor. In addition, any bias change due to temperature is compensated in the bridge circuit so that temperature effects are substantially cancelled and acceleration is more accurately read. However, temperature sensing piezoresistors RT1 and RT2 may also be coupled to appropriate circuitry to additionally compensate for any changes in temperature of the semiconductor element 14 and piezoresistive portions 28 and thereby further improve the accuracy of the acceleration detection. Since the temperature piezoresistors RT1 and RT2 are located in zero-stress areas on the semiconductor element 14, the piezoresistors RT1 and RT2 can provide temperature compensation independent of acceleration.

In operation, the transducer of FIG. 2 is used to sense acceleration solely in the y axis. Due to the configuration of mass ring portion 20 which locates the center of mass of the ring essentially in the plane of the diaphragm portion 18, the semiconductor element 14 will be responsive substantially to acceleration in the y axis or to components of acceleration in the y axis. Thereafter, by making the appropriate electrical connections to terminal pads 30 to produce the output voltage $e_o$ of the bridge circuit as shown in FIG. 6b, a voltage proportional to the acceleration in the y axis can be obtained and that voltage can then be used to drive indicator or control circuits. Because the acceleration-responsive element 14 can be etched using conventional microcircuit techniques, multiple elements may be simultaneously cut from the same silicon wafer thereby facilitating production of low cost transducers. The damping rings 22 and substrates 12 can likewise be formed and cut from large substrates using microcircuit techniques to again reduce the cost and complexity of the processes involved in forming the transducer. The elements 14 and 22 can be bonded to the substrate 12 using conventional bonding techniques capable of forming high-strength and reliable junctions. The formation of the terminal pads about the rectangular pedestal also facilitates easy insertion and removal of the transducer for coupling to the appropriate electronic detection and control circuitry.

It has been discovered that by using (100) silicon, for the semiconductor element 14, anisotropic (KOH) etching can be used to provide superior results in the etching process. Since KOH etching yields orthogonal patterns in (100) silicon, the rectangular arrangement of FIG. 1 is especially suitable for that technique. Patterns can be provided with a titanium/gold sputtered metalization mask for use in a two-step process wherein the diaphragm is first etched to a predetermined thickness before the mass ring portion 20 is etched to its desired thickness. It should be noted that because KOH etching is anisotropic the masking of the outside corners of the pedestal must be modified if orthogonal corners are to be obtained at the conclusion of the etch. The masking must provide additional material at the corners so that the final corner configuration is square. The amount of extra material needed may be easily determined with simple experimentation and will not be described further herein.

Turning next to FIG. 4, there is shown another embodiment of the present invention which enables the transducer 10 to be used to detect acceleration in three orthogonal axes. In this embodiment, the mass ring portion 20 is modified to have a supplemental mass ring portion 38 attached to and extending above the planar surface 19 of the element 14 such that the center of mass ring 20 (including supplemental ring 38) lies in a plane b which is located a predetermined distance h above the planar surface 19. The supplemental ring portion 38 may be configured as an L-shaped annular rectangular ring having support legs 40 retaining mass portion 42 above mass ring portion 20. In this embodiment, the supplemental mass ring portion 38 may be formed as a separate ring structure which can be bonded to semiconductor element 14 or it may be formed in any other manner capable of producing a mass ring portion 20 with a center of mass located a distance h above the planar surface 19 of the semiconductor element 14. The distance h in the present example may be 2.54 mm. Naturally, the damping ring 22 must be modified to accommodate the increase in size but again is constructed in a manner similar to the embodiment of FIG. 2 to prevent high resonant or shock damage.

Turning now to FIGS. 5 and 6, the operation of the transducer in the embodiment of FIG. 4 will be described. Referring again to FIG. 5, the orientation of the piezoresistors R1, R2, R3 and R4 is shown with respect to each of the orthogonal axes x, y and z. Also shown is the distance d from the edge of mass ring portion 20 to a line extending centrally through the resistive gauge portions R1, R2, R3 and R4 which in the present example may be 1.39 mm. In this configuration, each resistive portion 28 acts to sense strain induced by acceleration in each of the orthogonal axes x, y and z as if each of the resistances were located at the end of an independent beam. In the case of acceleration in the y direction, acceleration $AY \approx (\Delta R3)+(\Delta R4)-(\Delta R1)-(\Delta R2)$ and the element strain, which is proportional to acceleration and represented by the output voltage $e_o$, may be represented as:

$$\frac{m\,(a/g)\,d}{8}$$

where m is equal to the mass of the mass ring portions 20 and 38, a/g is a ratio of acceleration divided by the acceleration of gravity, and d is equal to the edge-to-gauge distance as shown in FIG. 5. In this instance, the acceleration is sensed using a full bridge circuit so that the output $e_o$ becomes proportional to four times the above and is thus represented as:

$$\frac{m\,(a/g)\,d}{2}.$$

For acceleration in the x or z axes, there are two piezoresistors which detect the moments produced by movement of mass ring 20 as reflected by diaphragm stress. In this instance acceleration in the x axis AX is approximately equal to $(\Delta R1)-(\Delta R2)$, acceleration in the z axis is approximately equal to $(\Delta R3)-(\Delta R4)$ and the element strain is proportional to:

$$\frac{m\,(a/g)\,h}{4}.$$

However, since resistors in a half bridge arrangement are used as shown in FIGS. 6a and 6c, the output $e_o$ is proportional to two times the above or:

$$\frac{m\,(a/g)\,h}{2}$$

where h is the distance of the center of mass of mass ring portions 20 and 38 above the surface 19 as shown in FIG. 4. Since the outputs $e_o$ are proportional to the strain induced in the bending diaphragm in accordance with the above relationships, and the strain is proportional to acceleration, the outputs can be easily calibrated to reflect acceleration in each of three orthogonal axes.

The electronic circuitry necessary to provide acceleration detection in each of the x, y and z axes is shown in FIG. 6 and appropriately labeled. Thus, acceleration in the x axis is read as the $e_o$ output taken between the junction of R2 and R1 and ground. The z axis output $e_o$ is taken between the junction of R4 and R3 and ground. Finally, the y axis output $e_o$ is taken from the bridge arrangement as was referenced with respect to the embodiment of FIG. 2. In order to provide simultaneous readout of acceleration indications for all three axes, an electrical bus coupling (not shown) to terminal pads 30 must be made to independently sense each of the outputs referenced in FIG. 6 and provide those outputs to electronic circuitry capable of using the outputs to display acceleration or provide control functions. As in the embodiment of FIG. 2, temperature sensors RT1 and RT2 may be used to provide independent temperature compensation for each of the acceleration measurements made by the piezoresistive strain gauges.

As can be seen from the above description, the present invention provides an improved transducer which enables more sensitive detection of acceleration and which may be easily modified for sensing acceleration in each of three orthogonal axes. The acceleration-responsive element is easily constructed using conventional microcircuit processing techniques and the piezoresistive strain gauge elements are likewise deposited using conventional techniques. The configuration of the piezoresistive elements and the particular semiconductor element 14, however, enable a more accurate and sensitive detection of acceleration. Specifically, the peripheral mass ring configuration allows more sensitivity with reduced transducer size while the bridge configuration allows improved temperature compensation. With only small modifications to the semiconductor element, the transducer may be used to detect acceleration in one axis or three orthogonal axes. These are all advantages that are not taught or recognized in the prior art.

While the invention has been described with reference to particular configurations and dimensions of the transducer, it is obvious that other shapes and sizes could be used without departing from the teachings. Obviously, many other modifications and variations are possible in light of the above teachings. It is therefore to be understood that within the scope of the appended claims, the invention may be practiced otherwise than as specifically described.

What is claimed is:

1. An acceleration transducer comprising:
   a mounting substrate;
   a central pedestal support portion coupled to said substrate;
   an elastic semiconductor diaphragm portion coupled to and peripherally surrounding said central pedestal support portion and extending generally parallel to said substrate;
   a mass ring portion coupled to and peripherally surrounding said diaphragm portion and spaced from said substrate, said mass ring portion being movable in response to acceleration to cause bending movement of said diaphragm portion; and
   means coupled to said diaphragm portion for detecting strain induced in said diaphragm portion in response to bending movement of said diaphragm portion for providing an output signal representing acceleration.

2. The transducer of claim 1 wherein said mass ring portion is constructed to move in response to acceleration substantially in one axis and said means for detecting includes a bridge circuit coupled to provide an output representing acceleration in said one axis.

3. The transducer of claim 1 wherein said mass ring portion is constructed to move in response to acceleration in each of three orthogonal axes and said means for detecting includes means for providing outputs representing acceleration in each of said three orthogonal axes.

4. The transducer of claim 1 wherein said substrate is an electrically non-conductive substrate and said support portion, diaphragm portion, and mass ring portion, are integrally formed from a single piece of semiconductive material.

5. The transducer of claim 4 wherein said support portion has a rectangular configuration and said diaphragm portion and mass ring portion are formed as rectangular rings.

6. The apparatus of claim 5 wherein said support portion, diaphragm portion, and mass ring portion are etched from a single piece of semiconductor material.

7. The transducer of claim 5 wherein said diaphragm portion has a surface and said means for detecting strain comprises a plurality of piezoresistive strain gauges located on the surface of said diaphragm portion with one piezoresistive gauge being positioned adjacent each side of the rectangular pedestal support portion on the surface of said diaphragm portion.

8. The transducer of claim 7 wherein said piezoresistive gauges are formed as a plurality of folded elongated strips all of which are arranged parallel to a preselected crystallographic axis of the semiconductor diaphragm portion.

9. The transducer of claim 7 wherein said mass ring portion is constructed to move in response to acceleration in one axis and said piezoresistive strain gauges are coupled to form a bridge circuit, the output of which represents acceleration in said one axis.

10. The transducer of claim 1 further including damping means coupled to said substrate and located adjacent the periphery of said mass ring portion for limiting the movement of said mass ring portion.

11. The transducer of claim 10 wherein said damping means comprises an L-shaped ring having a first portion coupled to and extending generally perpendicular to said substrate and a second portion projecting generally perpendicular to said first portion and extending over said mass ring portion to confine the movement of the mass ring portion between said second portion and said substrate.

12. The transducer of claim 1 further including temperature sensing means coupled in a zero-stress area on said diaphragm portion for providing an output indicative of the temperature of said diaphragm and strain detecting means.

13. The transducer of claim 1 wherein said mass ring portion is constructed to have a supplemental mass such that the center of mass of the ring portion is located a predetermined distance above the diaphragm and the mass ring portion moves in response to acceleration in each of three orthogonal axes, said means for detecting including means for providing outputs representing acceleration in each of said three orthogonal axes.

14. The transducer of claim 13 wherein said means for detecting strain includes a plurality of piezoresistive strain gauges located on the surface of said diaphragm portion wherein selected outputs from different combinations of said piezoresistive gauges provide the outputs representing acceleration in each of said three orthogonal axes.

15. An acceleration transducer comprising:
    a substrate having a planar surface;
    an acceleration-responsive semiconductor means formed from a single piece of semiconductor material and including a rectangular center pedestal support portion rigidly coupled to said substrate and having an elastic, planar diaphragm portion formed as a rectangular ring peripherally extending from said support portion generally parallel to the planar surface of said substrate, and further including a mass ring portion formed as a rectangular ring peripherally extending from said diaphragm portion and spaced from the planar surface of said substrate for movement in response to acceleration, said diaphragm portion having areas adjacent said support portion in which stress is induced in response to bending movement of said diaphragm and further having areas of zero-stress during bending movement;
    first, second, third and fourth piezoresistive means coupled on said diaphragm portion and located symmetrically about the periphery of said support portion with a radial separation of 90 degrees about the center of said support portion, each of said piezoresistive means being positioned to provide a measure of the strain produced in said diaphragm in response to bending movement caused by movement of said mass ring portion, said first, second, third and fourth piezoresistive means providing outputs representing acceleration; and
    fifth and sixth piezoresistive means coupled on said diaphragm portion in a zero-stress region for providing an output representing temperature of said semiconductor means.

16. The transducer of claim 15 wherein said mass ring portion is constructed to respond to acceleration in a single axis and said first, second, third and fourth piezoresistive means are coupled in a bridge circuit to provide an output representing acceleration in said axis.

17. The transducer of claim 15 further including a damping means having a first portion coupled to said substrate, adjacent said mass ring portion and having a second portion which extends above the mass ring portion to limit movement of the mass ring portion between said second portion and said substrate.

18. The transducer of claim 15 wherein said mass ring portion further includes a supplemental mass such that the center of mass of the mass ring portion is located a predetermined distance above the diaphragm and the mass ring portion moves in response to acceleration in each of three orthogonal axes, said first, second, third and fourth piezoresistive means providing outputs representing acceleration in each of said three orthogonal axes.

* * * * *